United States Patent
Ohara et al.

(10) Patent No.: US 9,981,858 B2
(45) Date of Patent: *May 29, 2018

(54) PROCESS FOR PRODUCING HEMATAITE FOR IRONMAKING

(71) Applicant: SUMITOMO METAL MINING CO., LTD., Tokyo (JP)

(72) Inventors: Go Ohara, Tokyo (JP); Yasumasa Kan, Tokyo (JP); Masaki Imamura, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 15/111,067

(22) PCT Filed: Jan. 9, 2015

(86) PCT No.: PCT/JP2015/050461
§ 371 (c)(1),
(2) Date: Jul. 12, 2016

(87) PCT Pub. No.: WO2015/107985
PCT Pub. Date: Jul. 23, 2015

(65) Prior Publication Data
US 2016/0340201 A1 Nov. 24, 2016

(30) Foreign Application Priority Data
Jan. 17, 2014 (JP) .................................. 2014-006871

(51) Int. Cl.
C01G 49/00 (2006.01)
C01G 49/06 (2006.01)
(Continued)

(52) U.S. Cl.
CPC ........... *C01G 49/06* (2013.01); *B01D 21/267* (2013.01); *B03C 1/025* (2013.01); *B03C 1/30* (2013.01);
(Continued)

(58) Field of Classification Search
CPC ....... C22B 23/0453; C22B 3/22; C22B 7/006; B03C 2201/18; B03C 2201/20;
(Continued)

(56) References Cited

U.S. PATENT DOCUMENTS 5,316,746 A  5/1994  Narita
7,964,165 B2  6/2011  Nakai
(Continued)

FOREIGN PATENT DOCUMENTS

AU  2009212947  4/2010
CA  2678724 A  3/2010
(Continued)

OTHER PUBLICATIONS

Interational Search Report dated Jul. 4, 2014.

*Primary Examiner* — Steven J Bos
(74) *Attorney, Agent, or Firm* — Gerald E. Hespos; Michael J. Porco; Matthew T. Hespos

(57) ABSTRACT

Proposed is a process for separating a leach residue from which a hematite-containing material that can be used as a raw material for ironmaking can be obtained, and provided is a production process of hematite for ironmaking from the leach residue. The process for producing hematite for ironmaking using, as a raw material, the leach residue in a slurry state obtained from a hydrometallurgical plant for nickel oxide ore utilizing a high pressure acid leach process comprises in sequence: a first step of separating the leach residue in a slurry state into an overflow and an underflow using a wet cyclone; a second step of separating the overflow into a
(Continued)

strong magnetic component and a weak magnetic component using a strong-magnetic-field magnetic separator utilizing magnetic force; and a third step of sintering the separated strong magnetic component at a temperature of 1150 to 1350° C. to form a sintered body.

3 Claims, 2 Drawing Sheets

(51) Int. Cl.
    *C22B 3/00*         (2006.01)
    *B03C 1/025*      (2006.01)
    *B03C 1/30*        (2006.01)
    *B01D 21/26*      (2006.01)

(52) U.S. Cl.
    CPC ...... *C22B 23/0453* (2013.01); *B03C 2201/20* (2013.01); *Y02P 10/212* (2015.11)

(58) Field of Classification Search
    CPC .......... B03C 1/30; B03C 1/025; C01G 49/06; B01D 21/267; B03B 5/34; B03B 7/00; Y02P 10/212

USPC ................ 209/39, 215, 725; 423/150.6, 633
See application file for complete search history.

(56) References Cited

U.S. PATENT DOCUMENTS

| 8,708,152 | B2 | 4/2014 | Lehtinen | |
| 9,752,209 | B2* | 9/2017 | Ohara | ...................... C22B 3/22 |
| 2015/0284820 | A1 | 10/2015 | Hattori | |
| 2016/0024614 | A1 | 1/2016 | Matsubara | |
| 2016/0076121 | A1 | 3/2016 | Ohara | |
| 2016/0152487 | A1 | 6/2016 | Ohara | |
| 2016/0362304 | A1 | 12/2016 | Ohara | |

FOREIGN PATENT DOCUMENTS

| JP | 62254851 A | 11/1987 |
| JP | 2001-234255 | 8/2001 |
| JP | 2010-95788 | 4/2010 |
| JP | 2011-214147 | 10/2011 |
| JP | 2013-151715 | 8/2013 |
| WO | 2007099714 A1 | 9/2007 |
| WO | 2014/175094 | 10/2014 |
| WO | 2015/001893 | 1/2015 |

\* cited by examiner

PROCESS FOR PRODUCING HEMATAITE FOR IRONMAKING

BACKGROUND

1. Field of the Invention

The present invention relates to a process for producing hematite for ironmaking.

2. Description of the Related Art

Particularly, the present invention relates to a technique for recovering hematite for ironmaking from a leach residue in a slurry state (hereinafter referred to as a tailings slurry) obtained from a final neutralization step in a hydrometallurgical plant by a high pressure acid leach (HPAL) process for nickel oxide ore.

Nickel has been widely used as a raw material of stainless steel, but with a tendency of depletion of a sulfide ore as a raw material of nickel, a technique of refining low-grade oxide ore has been developed and put into practical use.

Specifically, a production process called a high pressure acid leach (hereinafter referred to as HPAL) process has been put into practical use, in which a nickel oxide ore such as limonite and saprolite is put in a pressure device such as an autoclave together with a sulfuric acid solution, and nickel is leached at a high temperature of about 240 to 300° C. and high pressure.

FIG. 3 shows a schematic flow chart of the production steps of the HALP process.

Nickel leached in a sulfuric acid solution in the HPAL process is separated from a leach residue by adding a neutralizing agent to neutralize excess acid, followed by solid-liquid separation.

Subsequently, the nickel is subjected to a step of separating impurities and then recovered as an intermediate material in the form of a hydroxide, a sulfide, or the like, and the intermediate material is further refined to thereby obtain nickel as nickel metal or nickel chloride.

Note that in the step of neutralizing excess acid, the leachate is adjusted to a pH suitable for solid-liquid separation, and in the next step of solid-liquid separation, the concentration of solids and solid-liquid separation are performed in a facility called CCD (Counter Current Decantation). Generally, a plurality of successive stages of thickeners are used in CCD.

A liquid component (hereinafter may be referred to as an overflow) obtained from the CCD is transferred to a neutralization step so as to be adjusted to a pH suitable for a sulfurization step. In the neutralization step, the pH is adjusted, and fine solids produced are removed by precipitation. Then, the resulting liquid component is, for example, subjected to sulfurization treatment to produce an intermediate material, nickel sulfide.

In such a HPAL process, nickel can be leached substantially completely, for example, in the case of nickel oxide ore, even if the ore is a low grade ore containing a target valuable metal to be recovered in an amount of 1 to 2% by weight or less (hereinafter, % by weight is represented by %). That is, a target metal can be obtained by concentrating a target metal to the same degree as in a conventional raw material followed by employing substantially the same refining process and steps. Further, the HPAL process can be applied not only to nickel oxide ore but to other raw materials, such as nickel sulfide ore, copper sulfide ore, and copper oxide ore.

On the other hand, the main component of the leach residue remaining after nickel is recovered in the HPAL process is iron oxide; the content of iron in the solids of the leach residue is about 40 to 50%, and the quantity of production of the leach residue is about 50 times to 100 times of the quantity of production of the intermediate material. This is because nickel oxide ore and nickel sulfide ore as raw materials contain iron in an amount far exceeding the content of nickel.

The leach residue is in the state of a chemically and environmentally stable oxide since it is produced at high temperatures, but under the present circumstances, it does not have particular utility value and is accumulated and stored in a residue stacking yard.

Therefore, a large residue accumulation yard is required for accumulating and storing a huge amount of a leach residue produced with the operation of the HPAL process.

Incidentally, iron ore, which contains a large amount of iron oxide, is widely utilized as a raw material for steelmaking. In steel smelting, the iron ore containing iron oxide is charged into a blast furnace together with a reducing agent such as coke and heated to reduce and melt the iron ore to obtain crude steel. The crude steel is refined in a converter to produce target steel.

Generally, the iron ore serving as the raw material is limited resources, and, moreover, it is increasingly difficult to acquire good quality iron ore required for maintaining the quality of steel. Therefore, investigation of using a leach residue as iron ore has been made.

However, it has been difficult to directly use the leach residue from the HPAL process as a raw material for ironmaking for the following reasons.

Since the leach residue from the HPAL process contains vein stone, impurities, particularly sulfur in addition to iron oxide, it was not suitable as a raw material used for conventional common ironmaking processes. Specifically, this is because the leach residue has high sulfur grade.

Particularly, the sulfur grade in the iron oxide that can be utilized as a raw material for ironmaking, which changes depending on the equipment capacity, quantity of production, and the like of each iron mill, is generally required to be suppressed to less than 1%.

However, the solids of the leach residue contain about 5 to 8% of sulfur. Most sulfur in the leach residue is derived from calcium sulfate (gypsum) that is mixed in the HPAL process.

When free sulfuric acid (free sulfuric acid means an unreacted remaining acid in the sulfuric acid excessively added to perform sufficient leaching in the HPAL process) remaining in the leached slurry obtained in high pressure acid leach is neutralized, a neutralizing agent that is common, inexpensive, and calcium-based, for example limestone or slaked lime, is added. The gypsum is produced by the reaction between the calcium contained in the neutralizing agent and the free sulfuric acid and mixed into the leach residue.

Note that a part of sulfur (about 1%) contained in the leach residue solids is incorporated into hematite particles produced.

The solids in the residue after nickel leaching obtained at this time comprise particles which mainly comprise hematite and have a particle size of about 1 μm, and the iron grade in the solids is about 30 to 40%, and the sulfur grade is about 5 to 8%. Note that the moisture content of the leach residue obtained at this time is 60%.

In order to use this leach residue as hematite for ironmaking, it is necessary to refine the iron grade in the leach residue solids to 50% or more and to refine the sulfur grade to 1% or less.

As the technique for refining a leach residue, for example, Japanese Patent Laid-Open No. 2010-095788 describes a technique of subjecting the leach residue to separation by sieving, separation by a wet cyclone, or magnetic separation to remove impurities in a hematite mixture, and a certain effect has been observed in order to remove impurities in hematite.

However, the hematite obtained by the invention disclosed in Japanese Patent Laid-Open No. 2010-095788 has not been satisfactory when it is used singly as hematite for ironmaking. Particularly, the highest iron grade in the hematite obtained by the invention disclosed in Japanese Patent Laid-Open No. 2010-095788 is about 40 to 45%. Therefore, it has been necessary to mix it with a raw material for ironmaking containing a higher grade of iron in order to use it as hematite for ironmaking. Note that the moisture content of the leach residue obtained after physical separation in Japanese Patent Laid-Open No. 2010-095788 is about 40%.

The present invention, which has been made in order to provide a solution to such circumstances, proposes a process for separating a leach residue from which a hematite-containing material that can be used as a raw material for ironmaking can be obtained, and provides a production process for producing hematite for ironmaking from the leach residue.

SUMMARY

The present inventors have found that both the iron grade and the sulfur grade suitable for the raw material for ironmaking can be obtained at the same time by performing in sequence a separation step by a wet cyclone, a step of proper magnetic separation, and a step of proper sintering, and the finding has led to the completion of the present invention.

A first aspect of the present invention is a process for producing hematite for ironmaking using, as a raw material, a leach residue in a slurry state obtained from a hydrometallurgical plant for nickel oxide ore utilizing a high pressure acid leach process, the process for producing hematite comprising at least the following steps in sequence: a first step of separating the leach residue in a slurry state into an overflow and an underflow using a wet cyclone; a second step of separating the overflow into a strong magnetic component and a weak magnetic component using a strong-magnetic-field magnetic separator utilizing magnetic force; and a third step of sintering the separated strong magnetic component at a temperature of 1150 to 1350° C. to form a sintered body.

A second aspect of the present invention is the process for producing hematite for ironmaking according to the first aspect, wherein setting of classification size representing a separating condition of the wet cyclone in the first step is between 1 μm or less and 2 μm or less for the overflow; and magnetic field strength representing a separating condition of the strong-magnetic-field magnetic separator in the second step is 5 to 20 kGauss.

A third aspect of the present invention is the process for producing hematite for ironmaking according to the first aspect, wherein the process further comprises a dehydration step of adjusting a moisture content of the strong magnetic component to between 10% and 17%.

A fourth aspect of the present invention is the process for producing hematite for ironmaking according to the first aspect, wherein the process comprises, after the third step, a crushing step of bringing particle size of the formed sintered body to 3 to 20 mm.

According to the process for producing hematite for ironmaking of the present invention, a hematite-containing material having a grade that can be used as a raw material for ironmaking can be easily obtained from the refining process of oxide ores, which generates a remarkable effect on industry.

DETAILED DESCRIPTION

Hereinafter, the process for producing hematite for ironmaking of the present invention will be described in detail with reference to drawings.

Figure 1:
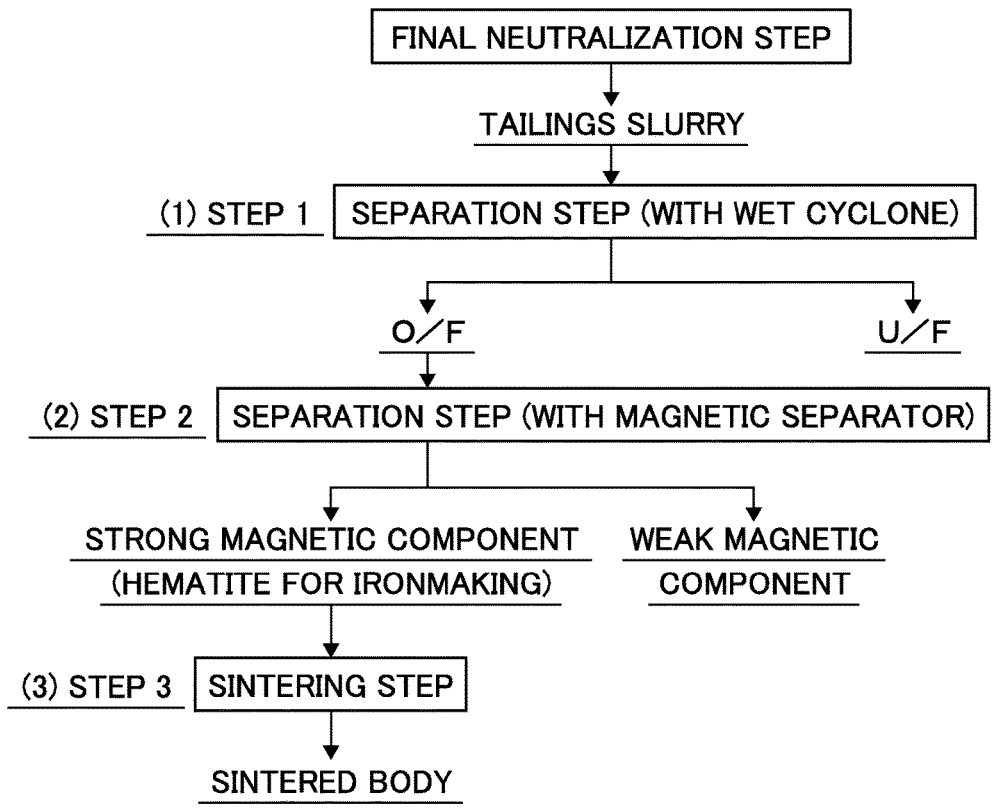
FIG. 1 is a flow chart of conventional production steps of hematite for ironmaking from the tailings slurry of the present invention.
Figure 2:
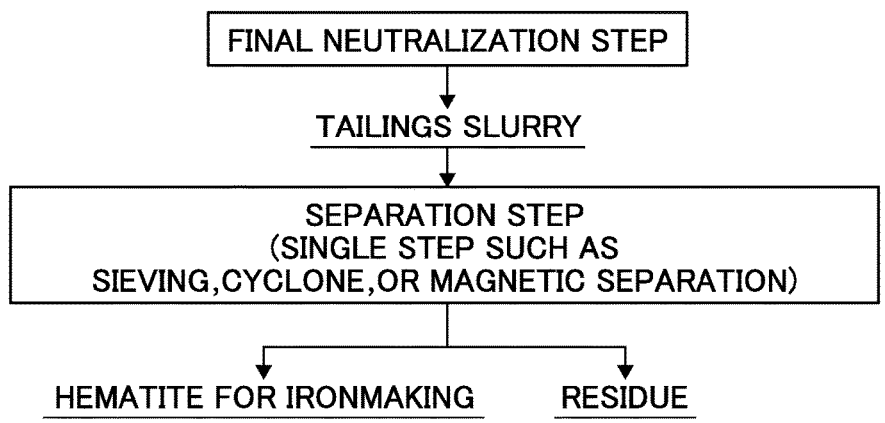
FIG. 2 is a flow chart of production steps of hematite for ironmaking from a tailings slurry.

FIG. 1 is a flow chart of production steps of hematite for ironmaking of the present invention.

Figure 3:
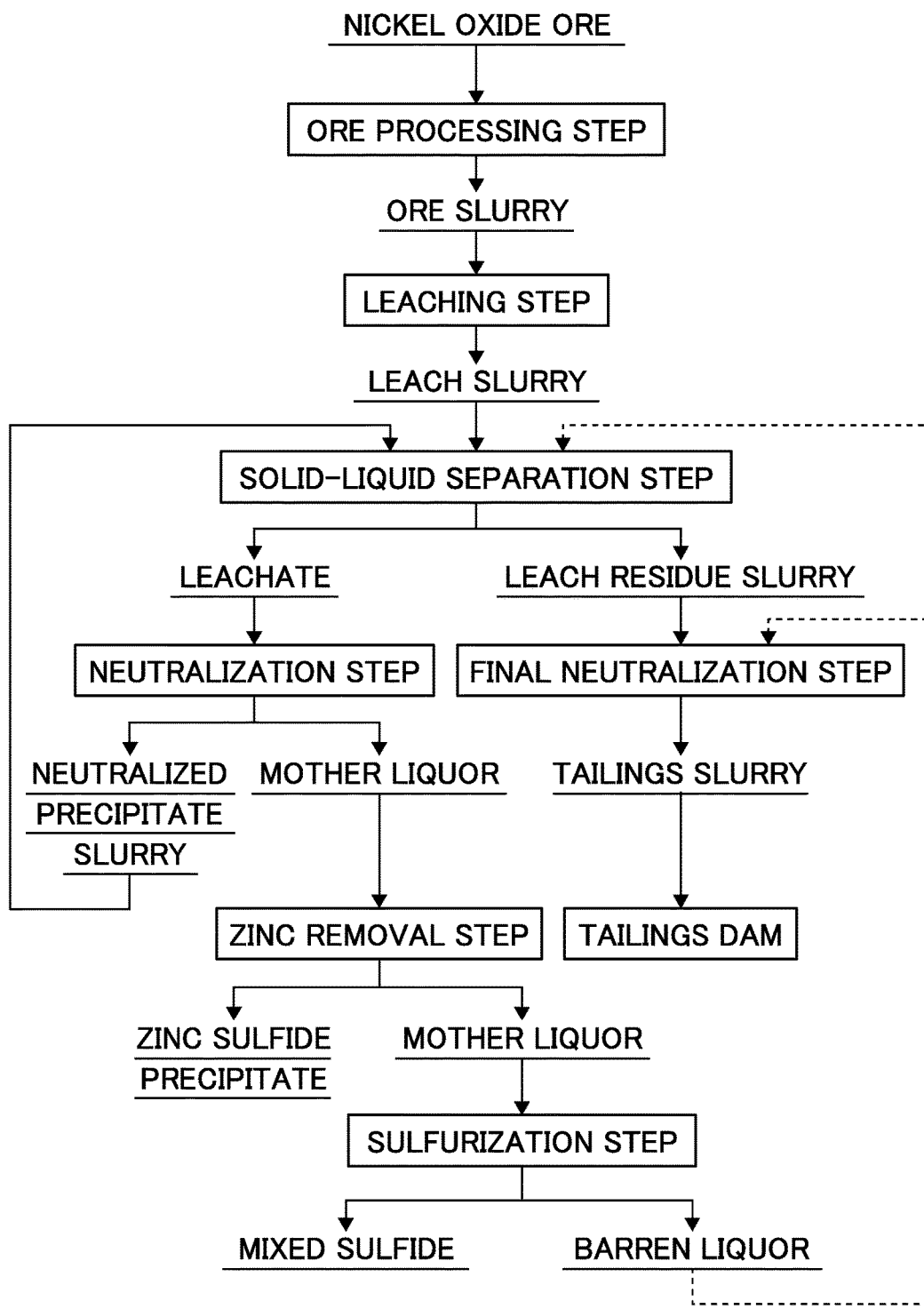
FIG. 3 is a schematic flow chart of production steps in the HPAL process.

The present invention provides a process for separating a material having a useful component composition from a leach residue in a slurry state (hereinafter means a "tailings slurry (final neutralization residue)" stored in a "tailings dam" in FIG. 3) which is discharged from a hydrometallurgical plant for nickel oxide ore utilizing a high pressure acid leach (HPAL) process as shown in a schematic flow chart of production steps of the HPAL process in FIG. 3 and has been subjected to neutralization treatment. The production steps of the process comprise in sequence: a first step of using a wet cyclone to separate the components of the tailings slurry into an overflow and an underflow; a second step of using a strong-magnetic-field magnetic separator utilizing magnetic force to separate the separated overflow component into a strong magnetic component and a weak magnetic component to obtain a hematite cake; and a third step of sintering the resulting hematite cake at a temperature of 1150 to 1350° C. to obtain a sintered body of hematite.

Thus, it is possible to obtain hematite for ironmaking with high iron grade and low sulfur grade having an iron grade of about 53% and a sulfur (S) grade of 1% or less, for example, from a tailings slurry having an iron grade of 30 to 35% and a sulfur (S) grade of 3 to 10%.

The composition with these grades can be singly used for ironmaking, and when it is used in combination with other raw materials for ironmaking, it has a large room for adjustment and is easily used.

[First Step]

A tailings slurry obtained by neutralization treatment of a leach residue slurry in the HPAL process is used as the raw material used in the process for producing hematite for ironmaking according to the present invention. In the solids of the tailings slurry, iron is contained in the form of hematite, and sulfur (S) is contained in the form of gypsum.

Further, for example, the hematite and the gypsum, which are contained in the solids of the leach residue obtained from the final neutralization step when nickel oxide ore is treated by the hydrometallurgy of the HPAL process, typically have a particle size of about 1 μm and about 30 μm, respectively. Therefore, when the classification size in the wet cyclone is set, the setting of the overflow may be first suitably adjusted depending on the particle size of the hematite and gypsum contained. However, the setting of the classification particle size in the wet cyclone is preferably "in a setting range from 1 μm or less to 2 μm or less for the overflow".

Particularly, in the above range, the classification effect in the wet cyclone can be enhanced.

Further, with respect to magnetism, hematite has weak magnetism, and other components showing magnetism are not contained. Note that the particle size is the D50 particle size that is measured, for example, by a laser diffraction process. Hereinafter, it is simply called the particle size.

In the present invention, when such a tailings slurry is charged into a wet cyclone, a large portion of gypsum having a large particle size will be removed as the underflow. On the other hand, hematite having a small particle size is concentrated in the overflow.

[Second Step]

Next, the resulting overflow is subjected to separation treatment using a "strong-magnetic-field magnetic separator" that can magnetize the overflow to a degree allowing separation into hematite and chromite.

The magnetic force used in typical magnetic separation is at most about 2000 Gauss, but since, for example, the "strong-magnetic-field magnetic separator" used in Examples employs a system of applying magnetic force to powder when the powder passes through a mesh, very strong magnetic force can be applied. The mesh is set so as to have the optimum opening for the powder to be separated.

Such a constitution enables separation of hematite and chromite which cannot be substantially separated by typical magnetic separation. Further, since gypsum remaining in a small amount does not have magnetism either, it can be separated from hematite.

Finally, as a result, hematite for ironmaking having an iron grade of about 53% and a sulfur (S) grade of about 1% is recovered as a hematite cake, which is a discharged material (magnetic adhesive material) on the magnetic material side of the above magnetic separator.

Further, a preferred condition of a magnetic field strength in the separation utilizing magnetic force is 5 to 20 kGauss.

This is because although a stronger magnetic field strength is basically preferred, the separation of hematite will be insufficient if the magnetic field strength is less than 5 kGauss. Further, if the magnetic field strength is more than 20 kGauss, a further effect will not be expected, and it is not economically preferred.

[Third Step]

Although the recovered hematite cake itself can be used as a raw material for ironmaking, it comprises very fine particles, which tend to cause clogging in a blast furnace and can be used only in a small amount. Therefore, the hematite cake which is a powder of very fine particles is preferably sintered to form a powder of coarse particles.

The hematite cake formed in the second step has an average particle size of 1 μm or less. Since such a very fine powder has good sintering properties, a sintering aid such as lime to be added during the sintering is not required. The sintering is performed at 1150 to 1350° C. to obtain a sintered body having a density of 4.0 g/cm3 to 5.0 g/cm3.

The density of the sintered body of hematite is preferably 4.0 g/cm3 to 5.0 g/cm3. If the density of the sintered body of hematite is less than 4.0 g/cm3, the number of holes in the sintered body of hematite increases to cause the occurrence of cracks in the sintered body of hematite. Further, if the density of the sintered body of hematite exceeds 5.0 g/cm3, the number of the holes in the sintered body of hematite will significantly decrease, and the diffusion of a reducing gas into the inner part of the sintered body of hematite will become slow, thus reducing the reduction efficiency of the reducing gas. Therefore, such a density is not preferred.

On the other hand, if the sintering temperature for obtaining a sintered body of hematite is less than 1150° C., the density of the sintered body of hematite will be less than 4.0 g/cm3, and if the sintering temperature is higher than 1350° C., the density of the sintered body of hematite will exceed 5.0 g/cm3.

Therefore, the temperature of sintering of a hematite cake is preferably 1150 to 1350° C.

It is believed that a large portion of sulfur remaining in the hematite cake is not sulfur derived from gypsum added as a neutralizing agent but sulfur derived from a sulfuric acid component incorporated into the hematite particles in the step of high pressure acid leach. Almost the whole amount of the sulfur derived from sulfuric acid in the high pressure acid leach step can be removed as SOx by sintering the hematite cake at 1150° C. to 1350° C.

That is, the hematite for ironmaking with high iron grade and low sulfur grade having a sulfur (S) grade of 1% or less can be obtained.

The particle size of the sintered body of hematite is preferably 3 to 20 mm.

If the particle size is less than 3 mm, such particles will cause clogging in a blast furnace, reducing the flow of a reducing gas. On the other hand, if the particle size exceeds 20 mm, reaction time will be increased to cause the reduction of productivity.

As described above, the process for producing hematite for ironmaking of the present invention has the greatest feature in that the separation is first performed using a wet cyclone and then performed using a strong-magnetic-field magnetic separator. However, it is difficult to efficiently recover the hematite for ironmaking only by a simple combination of the step of separation using a wet cyclone and the step of separation using a strong-magnetic-field magnetic separator, for example, by a combination in the reverse sequence of the above sequence.

Specifically, this is because if the separation step using a strong-magnetic-field magnetic separator is first performed, it will be difficult to give enough magnetic force to hematite and chromite each having a small particle size to separate the both since gypsum having a particle size greatly different from that of hematite and chromite is present. Further, the separation will be difficult also by a system of applying magnetic force of a strong-magnetic-field magnetic separator to be used.

For example, in the "strong-magnetic-field magnetic separator" which employs a system of applying magnetic force to a powder when the powder passes through a mesh and has been used also in Examples, this is because gypsum having a large particle size will clog the mesh from immediately after operation, thus preventing the separating operation from proceeding.

[Dehydration Step: Adjustment of Moisture Content]

On the other hand, in the production process of the present invention, the hematite cake obtained by subjecting a strong magnetic component obtained after physical separation treatment (having a moisture content of about 40%) to typical dehydration treatment has a sulfur content as low as less than 1% and a relatively high moisture content of about 22%.

Generally, in the transportation of solid matter, it is said that a high moisture content may cause liquefaction during transport by ships, thus causing a turnover thereof. According to the search results by Japan Marine Surveyors and Sworn Measurers' Association, the transportable moisture limit (TML) of the hematite of the present invention was 17% or less. Therefore, in the case where the hematite of the present invention is conveyed by ships, it is necessary to reduce the moisture content when the hematite cake of the present invention is produced.

At the same time, since the resulting hematite cake has a very fine hematite particle size of about 1 μm, the possibility of raising dust is very high. This raising dust will decrease when the moisture content increases. When the moisture content is reduced from 17%, the raising dust tends to significantly increase at about 10%. Therefore, the moisture content is preferably 10% to 17%. When a countermeasure for suppressing raising dust, such as using a flexible container during handling, is possible, a lower moisture content is preferred.

Therefore, the moisture content is preferably adjusted. The present invention includes a dehydration step of performing dehydration treatment in which moisture is removed from a hematite cake so that the moisture content may be 10% to 17% as described above.

The dehydration includes a heating, a filter press, and a centrifuge separation, but a filter press is desirable in terms of high water removal efficiency and economical efficiency.

EXAMPLES

Hereinafter, the present invention will be described in more detail with reference to Examples and Comparative Examples. Production conditions and measurement of properties common to Examples and Comparative Examples are summarized in Table 1.

TABLE 1

| Tailings slurry | Solid content: | 35 [%] |
| --- | --- | --- |
| | [Solid components] | |
| | Iron: | 35 [%] |
| | Sulfur (S): | 7 [%] |
| | Hematite particle size: | 0.7 [μm] |
| | Gypsum particle size: | 30 [μm] |
| | Treatment speed: | 400 [ton/hr] |
| Wet cyclone | Apparatus: | Model "SC224-P" manufactured by SOLDER CYCLON CORPORATION |
| | Classification setting condition: | The setting of classification size for overflow is between 1 μm or less and 2 μm or less |
| Magnetic separation | Apparatus: | High Gradient Magnetic Separator, Model "120" manufactured by MESSO CORPORATION |
| | Opening of mesh of magnetic field applying part: | 50 [μm] |
| | Magnetic field strength: | 12 [KGauss] |
| Particle size measurement | Apparatus: | Model "SALD-3100" manufactured by SHIMADZU CORPORATION |
| | Measured value: | D50 particle size by laser diffraction method |
| Sintering | Apparatus: | Hearth rise and fall type high temperature furnace" manufactured by MARUSHO DENKI CO., LTD. |
| | Sintering process: | The temperature of sintering material is measured with a thermocouple, and the material is sintered at a set sintering temperature for a set sintering time. |

Example 1

The present invention was applied in the separation of the tailings slurry described in Table 1. The tailings slurry was first treated with a wet cyclone in which the setting of the classification size for the overflow was 1.2 μm or less as the classification condition shown in Table 1, and then the resulting overflow was separated with the above magnetic separator.

With respect to the treatment amount of solids, 10 tons of the tailings slurry was treated, and the weight of the resulting overflow in a slurry state was 9.1 tons.

As a result of magnetic separation, a hematite cake having an iron grade of 53%, a sulfur (S) grade of 0.7%, and a solid weight of 2.2 tons was obtained. The particle size of the hematite was 0.6 μm.

The hematite cake (10 cm×20 cm×1 cm) was sintered at 1150° C. for 10 minutes. The resulting hematite sintered body had a density of 4.0 g/cm3, an iron grade of 54%, and a sulfur (S) grade of 0.08%.

Example 2

The present invention was applied in the separation of the tailings slurry described in Table 1. The tailings slurry was first treated with a wet cyclone in which the setting of the classification size for the overflow was 1.2 μm or less as the classification condition shown in Table 1, and then the resulting overflow was separated with the magnetic separator.

With respect to the treatment amount of solids, 10 tons of the tailings slurry was treated, and the weight of the resulting overflow in a slurry state was 9.1 tons.

2.2 tons of the hematite cake obtained by the magnetic separation was subjected to high pressure filter pressing (with a high pressure heating filter) to thereby obtain a hematite cake having an iron grade of 52%, a sulfur (S) grade of 0.8%, a moisture content of 15%, and a solid weight of 2.0 tons. The particle size of the resulting hematite was 0.7 μm.

The hematite cake (10 cm×20 cm×1 cm) was heated at 1350° C. for 10 minutes. The resulting hematite sintered body had a density of 5.0 g/cm3, an iron grade of 53%, and a sulfur (S) grade of 0.01%.

Example 3

The present invention was applied in the separation of the tailings slurry described in Table 1. The tailings slurry was first treated with a wet cyclone in which the setting of the classification size for the overflow was 1.2 μm or less as the classification condition shown in Table 1, and then the resulting overflow was separated with the above magnetic separator. With respect to the treatment amount of solids, 10 tons of the tailings slurry was treated. The weight of the resulting overflow in a slurry state was 9.1 tons.

2.2 tons of the hematite cake obtained by the magnetic separation was subjected to high pressure filter pressing (with a high pressure heating filter) to thereby obtain 2.0 tons a hematite cake having an iron grade of 52%, a sulfur (S) grade of 0.8%, and a moisture content of 15%. The particle size of the resulting hematite was 0.7 μm.

The resulting hematite cake (10 cm×20 cm×1 cm) was sintered at 1150° C. for 10 minutes.

The resulting sintered body had an iron grade of 53%, a sulfur (S) grade of 0.08%, and a density of 4.3 g/cm$^3$.

Example 4

The treatment of Example 4 was performed in completely the same manner as in Example 1 except that, in the treatment conditions of Example 1, the setting for the wet cyclone was changed to 1 μm or less, and the magnetic field strength of the magnetic separator was changed to 5 kGauss.

The weight of the resulting overflow in a slurry state was 8 tons.

When magnetic separation treatment was performed, a hematite cake having an iron grade of 52%, a sulfur (S) grade of 0.8%, and a solid weight of 1.6 tons was obtained.

The particle size of the resulting hematite was 0.5 μm.

The hematite cake (10 cm×20 cm×1 cm) was sintered at 1150° C. for 10 minutes, and then the resulting sintered body was crushed with a jaw crusher. The hematite sintered body obtained by crushing had a density of 4.0 g/cm3, an iron grade of 53%, a sulfur (S) grade of 0.08%, and a particle size of 3 mm.

Example 5

The treatment of Example 5 was performed in completely the same manner as in Example 1 except that, in the treatment conditions of Example 1, the setting of the wet cyclone was changed to 2 μm or less, and the magnetic field strength of the magnetic separator was changed to 20 kGauss.

The weight of the resulting overflow in a slurry state was 9.3 tons.

When magnetic separation treatment was performed, a hematite cake having an iron grade of 55%, a sulfur (S) grade of 0.9%, and a solid weight of 2.3 tons was obtained. The particle size of the hematite was 0.9 μm.

The hematite cake (10 cm×20 cm×1 cm) was sintered at 1150° C. for 10 minutes, and then the resulting sintered body was crushed with a jaw crusher.

The hematite sintered body obtained after crushing had a density of 4.0 g/cm3, an iron grade of 56%, a sulfur (S) grade of 0.08%, and a particle size of 20 mm.

Comparative Example 1

Hematite was produced from tailings slurry under the same conditions as in Example 1 except that the present invention was not applied; the separation by magnetic separation using the magnetic separator described in Table 1 was not performed; and the sintering was not performed either.

As a result, 7.9 tons of solids having an iron grade of 37% and a sulfur (S) grade of 5% was obtained, but only hematite that cannot be singly utilized as the hematite for ironmaking was able to be produced.

Comparative Example 2

Hematite was produced from tailings slurry under the same conditions as in Example 1 except that the present invention was not applied; the separation with the wet cyclone described in Table 1 was not performed; and the sintering was not performed either.

As a result, production was not able to be continued because, in the magnetic separation, the mesh to which magnetic force is applied in the apparatus described in Table 1 was clogged immediately after starting operation.

Comparative Example 3

Hematite was produced from tailings slurry under completely the same conditions as in Example 1 except that, in the treatment conditions of Example 1, the setting of the wet cyclone was changed to 0.4 μm or less; the magnetic field strength of the magnetic separator was changed to 4 kGauss; and the sintering was not performed.

The weight of the resulting overflow in a slurry state was 0.5 ton.

When magnetic separation treatment was performed, a very small amount of low grade hematite having an iron grade of 49%, a sulfur (S) grade of 1.2%, and a solid weight of 0.01 ton was obtained.

The particle size of the resulting hematite was 0.2 μm.

Comparative Example 4

Hematite was produced from tailings slurry under completely the same conditions as in Example 1 except that, in the treatment conditions of Example 1, the setting of the wet cyclone was changed to 2.5 μm or less; the magnetic field strength of the magnetic separator was changed to 22 kGauss; and the sintering was not performed.

The weight of the resulting overflow in a slurry state was 9.3 tons.

When magnetic separation treatment was performed, hematite having a high sulfur (S) grade was obtained, in which the hematite had an iron grade of 52%, a sulfur (S) grade of 1.5%, and a solid weight of 2.1 tons.

The particle size of the resulting hematite was 1.3 μm.

Comparative Example 5

Hematite was produced from tailings slurry under the same conditions as in Example 2 except that the sintering temperature was changed to 1400° C.

The particle size of the resulting hematite was 0.6 μm.

The resulting hematite cake (10 cm×20 cm×1 cm) was sintered at 1400° C. for 10 minutes.

The resulting sintered body had an iron grade of 52%, a sulfur (S) grade of 0.01%, and a density of 5.2 g/cm$^3$.

Comparative Example 6

Hematite was produced from tailings slurry under the same conditions as in Example 2 except that the sintering temperature was changed to 1050° C.

The particle size of the resulting hematite was 0.6 μm.

The resulting hematite cake (10 cm×20 cm×1 cm) was sintered at 1050° C. for 10 minutes.

The resulting sintered body had an iron grade of 52%, a sulfur (S) grade of 0.2%, and a density of 3.8 g/cm$^3$.

The invention claimed is:

1. A process for producing hematite for ironmaking using, as a raw material, a leach residue obtained from a hydrometallurgical plant for nickel oxide ore utilizing a high pressure acid leach process, the process for producing hematite comprising at least the following steps in sequence:
   a first step of separating the leach residue into an overflow and an underflow by using a wet cyclone under a condition that the wet cyclone is adjusted to have a setting between 1 μm or less and 2 μm or less for the overflow as a classification size for the overflow;
   a second step of separating the overflow into a strong magnetic component and a weak magnetic component by a strong-magnetic-field magnetic separator utilizing magnetic force having a magnetic field strength of 5 to 20 kGauss; and
   a third step of sintering the separated strong magnetic component at a temperature of 1150 to 1350° C. to form a sintered body.

2. The process for producing hematite for ironmaking according to claim 1, further comprising a dehydration step of adjusting a moisture content of the strong magnetic component to between 10% and 17%.

3. The process for producing hematite for ironmaking according to claim 1, comprising, after the third step, a crushing step of bringing particle size of the sintered body to 3 to 20 mm.

\* \* \* \* \*